United States Patent [19]

Tyler

[11] 4,361,655

[45] Nov. 30, 1982

[54] PROCESSABLE SILICONE RUBBER COMPOSITION

[75] Inventor: Keith A. Tyler, Lincoln, Nebr.

[73] Assignee: The Goodyear Tire & Rubber Company, Akron, Ohio

[21] Appl. No.: 288,621

[22] Filed: Jul. 30, 1981

[51] Int. Cl.³ .............................................. B29H 19/00
[52] U.S. Cl. ................................ 521/47.5; 264/209.1; 525/477
[58] Field of Search ......................... 260/2.3; 525/477; 521/47.5

[56] References Cited

U.S. PATENT DOCUMENTS

| | | | |
|---|---|---|---|
| 2,666,035 | 1/1954 | Pfeifer | 260/2.3 |
| 3,063,957 | 11/1962 | Kochis | 260/2.3 |
| 4,233,426 | 11/1980 | Griffin | 525/477 |

Primary Examiner—Wilbert J. Briggs, Sr.
Attorney, Agent, or Firm—J. D. Wolfe

[57] ABSTRACT

An improved processable silicone rubber composition composed of a blend of 1 to 10 percent by weight of vulcanized particulate silicone rubber and 99 to 90 percent by weight of unvulcanized or virgin silicone rubber that can be tubed at a faster rate and lower temperature to minimize structure formation.

2 Claims, No Drawings

PROCESSABLE SILICONE RUBBER COMPOSITION

TECHNICAL FIELD

This invention relates to an improved processable silicone rubber composition that can be extruded as a hose at faster rates and lower temperature at the same pressure setting. More particularly this invention relates to an improved processable silicone rubber composition of 1 to 10 weight percent of particulate vulcanized silicone rubber, preferably of less than 20 microns, and 99 to 90 weight percent of unvulcanized silicone rubber.

BACKGROUND

It is known to reclaim rubber by cracking on a mill and then processing with heat and a processing oil. Also it is known to grind vulcanized rubber to give particulate rubber and to reuse the reclaimed rubber with virgin stock, but the resulting vulcanizates deteriorate to a substantial extent.

DISCLOSURE AND PRACTICE OF THE INVENTION

Applicant has discovered that vulcanized silicone rubber reclaimed by grinding in a liquid nitrogen atmosphere to a particle size of 90 percent less than 20 microns (0.0008 inch) a powdery particle can be blended in the amount of 1 to 10 percent by weight with 99 to 90 percent by weight of unvulcanized silicone rubber to give a silicone rubber composition having improved processability to yield faster extrusion rates at a lower temperature to give an extrudate that exhibits less structuring.

Generally the vulcanized particulate silicone rubber used in this invention is scrap frequently resulting from trimmings from manufacturing operations such as mold extruding or off specification silicone rubber products, specifically hose. The scrap vulcanized silicone rubber is perferably mixed with unvulcanized silicone rubber on a two roll mill.

The nature and advantages of this invention can be seen more readily and appreciated by reference to the following representative example where all parts and percentages are by weight unless otherwise indicated.

EXAMPLE

Scrap vulcanized silicone rubber resulting from processing silicone rubber into hose and trimmings from other vulcanized silicone rubber processes was ground by the Gould process as described in U.S. Pat. Nos. 4,046,834 and 4,049,588 to give very fine particles of 20 microns and less. Three percent by weight of this very fine particle Gould processed vulcanized silicone rubber scrap was mixed on a warm up mill with 97 percent by weight of unvulcanized or raw silicone rubber. This blend of very fine ground vulcanized silicone rubber and unvulcanized silicone rubber was transferred from the warm up mill to an extruder of the hot feed tuber type and extruded as 38.1 millimeter tube.

Comparison extrusion runs at the same tuber setting with stock going from warm up mill to the extruder at the same temperature were made with uncured virgin silicone rubber as the control and the above experimental blend. These comparison runs demonstrated that the tubing rats were as follows:

| Stock | Extrusion Rate | | Temperature | |
|---|---|---|---|---|
| | Feet/Minute | Kilometer/Minute | °F. | °C. |
| Trial Run #1 | | | | |
| Control | 31 | — | 205 | — |
| Experimental | 35 | — | 195 | — |
| Trial Run #2 | | | | |
| Control | 30 | — | 200 | — |
| Experimental | 34 | — | 185 | — |

These two trial runs demonstrate the blend gave faster extrusion rates and the stock exited the extruder or tuber at a lower temperature to give extrudates with less structure. Generally structuring is a phenomenon that occures when silicone rubber is processed at excessive temperatures and is observed as flow lines, cracking or surface roughness of the extruded unvulcanized rubber over a period of time. With silicone rubber cracking is primarily evidence of structuring and cracking can be minimized by reducing or lowering the extrusion temperature.

While certain representative embodiments and details have been shown for the purpose of illustrating the invention it will be apparent to those skilled in this art that various changes and modifications may be made therein without departing from the spirit or scope of the invention.

I claim:

1. An improved processing silicone rubber composition composed of 1 to 10 weight percent of vulcanized powdery particulated silicone rubber having an average particle size of less than 20 microns and 99 to 90 weight percent of unvulcanized silicone rubber.

2. A method of tubing silicone rubber comprising mixing 1 to 10 weight percent of unvulcanized powdery particulate silicone rubber having an average particle size of less than 20 microns with 99 to 90 weight percent of unvulcanized silicone rubber to obtain a blend and then extruding said blend to form a tube.

* * * * *